(12) United States Patent
Son et al.

(10) Patent No.: US 8,371,947 B2
(45) Date of Patent: Feb. 12, 2013

(54) POWER TRANSMISSION DEVICE OF CLUTCHLESS COMPRESSOR

(75) Inventors: Eun Gi Son, Daejeon (KR); Seung-Kil Kim, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 1002 days.

(21) Appl. No.: 12/129,871

(22) Filed: May 30, 2008

(65) Prior Publication Data

US 2008/0300078 A1    Dec. 4, 2008

(30) Foreign Application Priority Data

Jun. 1, 2007    (KR) .................. 10-2007-0054077

(51) Int. Cl.
*F16D 9/06* (2006.01)
(52) U.S. Cl. .......................... 464/32; 474/902
(58) Field of Classification Search .............. 474/70, 474/94, 902; 464/32, 33; 417/223, 319; 192/56.5; 403/2
See application file for complete search history.

(56) References Cited

U.S. PATENT DOCUMENTS

| | | | | |
|---|---|---|---|---|
| 2,964,931 A | * | 12/1960 | Sorenson | 464/32 |
| 5,443,372 A | * | 8/1995 | Kanoll | 417/319 |
| 7,066,819 B2 | * | 6/2006 | Ueda et al. | 464/32 |
| 7,303,477 B2 | | 12/2007 | Son et al. | |
| 2005/0221932 A1 | * | 10/2005 | Umemura et al. | 474/70 |

* cited by examiner

*Primary Examiner* — William A Rivera
(74) *Attorney, Agent, or Firm* — Rabin & Berdo, P.C.

(57) ABSTRACT

The present invention relates to a power transmission device of the clutchless compressor, which includes: a pulley; a hub disposed in one side face of the pulley and connected to a driving shaft of a compressor; a drive-side connection member including a connection portion detachably connected to one side face of the pulley and a breaking portion connected to the connection portion and broken when a torque above a preset value is generated in the compressor; and a driven-side connection member connected to one side face of the hub and is connected to the breaking portion and including a plastic deformation portion outside the driven-side connection member so that the driven-side connection member is plastic deformed or is broken due to plastic deformation if a rotational shock is applied from the connection portion to a remaining breaking member remaining even after the breaking portion is broken.

13 Claims, 8 Drawing Sheets

POWER TRANSMISSION DEVICE OF CLUTCHLESS COMPRESSOR

CROSS-REFERENCE TO RELATED PATENT APPLICATIONS

This application claims the benefit of Korean Patent Application No. 10-2007-0054077, filed on Jun. 1, 2007, in the Korean Intellectual Property Office, the disclosure of which is incorporated herein in its entirety by reference.

BACKGROUND OF THE INVENTION

1. Field of the Invention

The present invention relates to a power transmission device of a clutchless compressor, and more particularly, to a power transmission device of a clutchless compressor which prevents damage of an engine belt and unnecessary noise that may occur while a breaking portion connecting a pulley-side and a hub-side is broken when a torque above a preset value is generated in a compressor when power is transmitted to the compressor from an engine.

2. Description of the Related Art

In general, air conditioning systems for a car keep the temperature inside the car lower than the internal temperature due to a cycle of circulation such as compression, condensation, vaporization of a refrigerant. Essential elements of the circulation cycle include a compressor, a condenser, an expansion valve, and an evaporator.

The type of a compressor among the elements of the circulation cycle includes a variable capacity type compressor which adjusts required power according to the state of air conditioning. A demand for the variable capacity type compressor has been gradually increased. The variable capacity type capacitor does not need a clutch which controls a drive force transmitted to a compressor from an engine.

However, due to a failure such as seizing etc. inside a driving shaft of the compressor, a considerably larger overload torque than a normal transmission torque occurs in the driving shaft of the compressor. Thus, a pulley may not rotate any more and may stop. In this case, an engine belt driven by an engine slides on the pulley continuously and is worn (belt slip). Furthermore, the engine belt may be broken due to friction heat generated during friction with the pulley.

To solve the problems, a conventional power transmission device and hub of a compressor are illustrated in FIGS. 1 and 2 (U.S. Pat. No. 7,303,477).

As illustrated in FIGS. 1 and 2, the conventional power transmission device comprises a pulley 10, a hub 20, a driven-side connection member 30, and a drive-side connection member 40.

The pulley 10 is rotatably installed at a nose portion (not shown) protruding from a front housing (not shown) of a compressor (not shown). The pulley 10 is rotated by a rotational force transmitted from an engine which is a driving power source, and a flange 12 protrudes from one side face of the pulley 10. In other words, the pulley 10 is supported by a bearing 13 installed in a through hole 11 formed in the middle of the pulley 10 and is rotatably installed at the nose portion of the front housing. The flange 12 may be integrally formed with the pulley 10, and an additional bearing bore 14 may be inserted in the through hole 11, and the flange 12 may protrude from one end of the bearing bore 14. If the bearing bore 14 is installed in the through hole 11, the bearing 13 is installed in the bearing bore 14.

The hub 20 is disposed in the through hole 11 formed in the middle of the pulley 10. The hub 20 comprises a hub body 21 connected to a driving shaft (not shown) of the compressor and a cover plate 22 integrally formed in the outer peripheral face of the hub body 21. A connection hole 23 which the driving shaft perforates is formed in the hub body 21. In addition, an edge of the cover plate 22 is bent toward the pulley 10 to encompass the driven-side connection member 30 and the drive-side connection member 40, which will be described below.

The driven-side connection member 30 is connected to the hub 20, and more particularly, is connected to the cover plate 22 of the hub 20. To this end, a plurality of seating grooves 32 are formed in the outer peripheral face of the driven-side connection member 30, and a damper 50 is seated in the seating grooves 32 so as to absorb shock, and a projection 24 protruding from an inside of the cover plate 22 of the hub 20 is combined with the damper 50. The damper 50 is generally formed of a rubber material so as to have a predetermined elastic force.

The drive-side connection member 40 comprises a connection portion 41 detachably connected to one side face of the pulley 10, and a breaking portion 42 connecting the connection portion 41 with the driven-side connection member 30 and broken when a torque above a preset value is generated in the compressor.

The connection portion 41 of the drive-side connection member 40 forms a tap 41a in the inner peripheral face of the connection portion 41 and can be screwed to the outer peripheral face of the flange 12 protruding from one side face of the pulley 10. Although not shown, besides screw connection, the flange 12 may be forcibly press-fitted and inserted in the inner peripheral face of the connection portion 41 and may be connected thereto.

The breaking portion 42 of the drive-side connection member 40 connects the connection portion 41 and the driven-side connection member 30, and when a torque above a preset value is generated in the compressor, the breaking portion 42 is broken and intercepts a power transmission path connected to the driven-side connection member 30 from the drive-side connection member 40.

After the breaking portion 42 is broken, a shock providing portion 43 which transmits a rotational shock to a remaining breaking member 42a causing interference while remaining in the driven-side connection member 30 is formed to the connection portion 41 of the drive-side connection member 40.

However, after the breaking portion 42 is broken, the remaining breaking member 42a causes interference with the connection portion 41 of the drive-side connection member 40 while the connection portion 41 rotates continuously due to the pulley 10 so that excessive noise occurs in the remaining breaking member 42a.

Furthermore, if interference occurs in the breaking portion 42 continuously, a shock load is given to the engine several times and thus, the engine belt may be damaged.

SUMMARY OF THE INVENTION

The present invention provides a power transmission device of a clutchless compressor having an improved structure which prevents damage of an engine belt and unnecessary noise that may occur due to interference in a remaining breaking member of a breaking portion broken when a torque above a preset value is generated in a compressor.

According to an aspect of the present invention, there is provided a power transmission device of a clutchless compressor, the device including: a pulley rotated by a rotational force transmitted from a driving power source; a hub disposed in one side face of the pulley and connected to a driving shaft of a compressor; a drive-side connection member including a connection portion detachably connected to one side face of the pulley and a breaking portion connected to the connection portion and broken when a torque above a preset value is generated in the compressor; and a driven-side connection member connected to one side face of the hub and connected to the breaking portion and including a plastic deformation portion outside the driven-side connection member so that the driven-side connection member is plastic deformed or is broken due to plastic deformation if a rotational shock is applied from the connection portion to a remaining breaking member remaining even after the breaking portion is broken.

The plastic deformation portion may be a depression formed in a portion to which the breaking portion of the drive-side connection member is connected, of an outer peripheral face of the driven-side connection member.

The driven-side connection member may be formed of plastics.

A projection may be formed in one side face of the depression so that the depression is stepped toward the compressor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
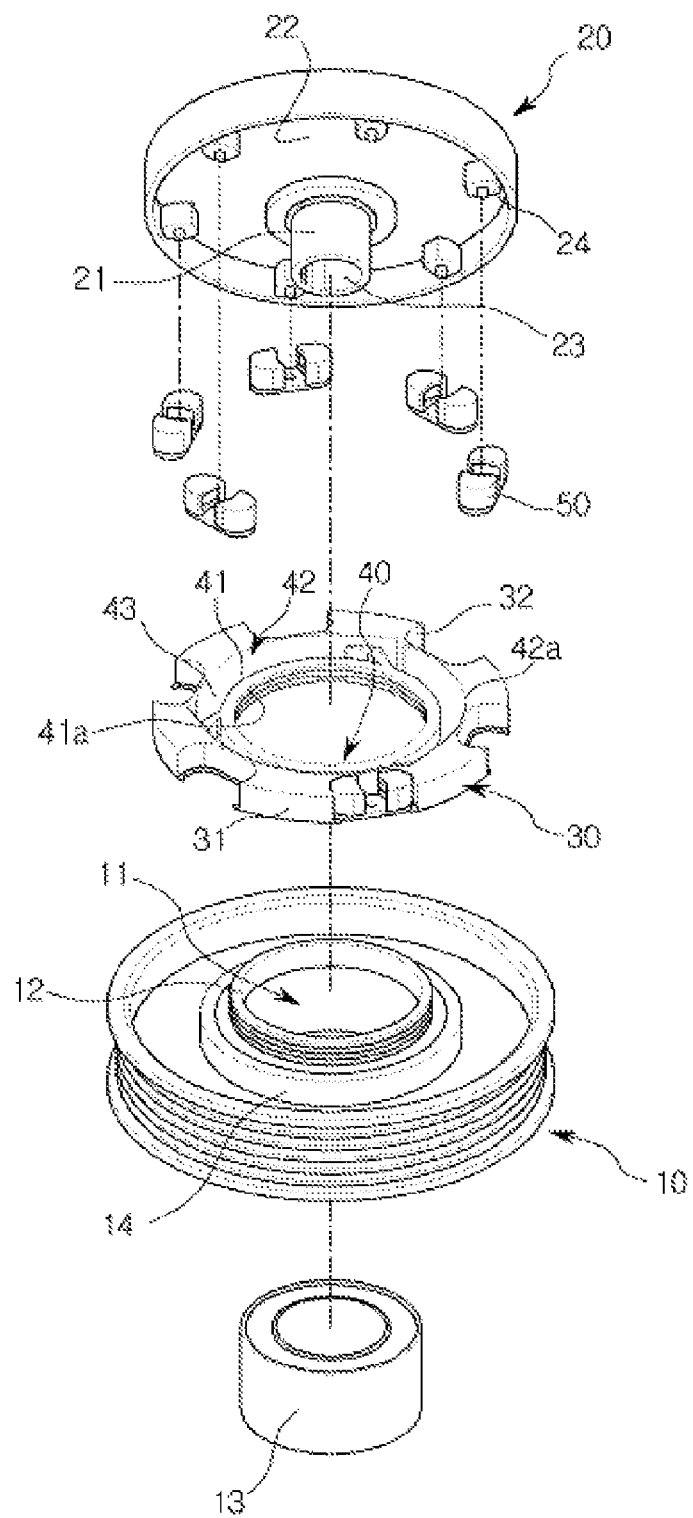
FIG. 1 is an exploded perspective view of a conventional power transmission device of a compressor.
Figure 2:
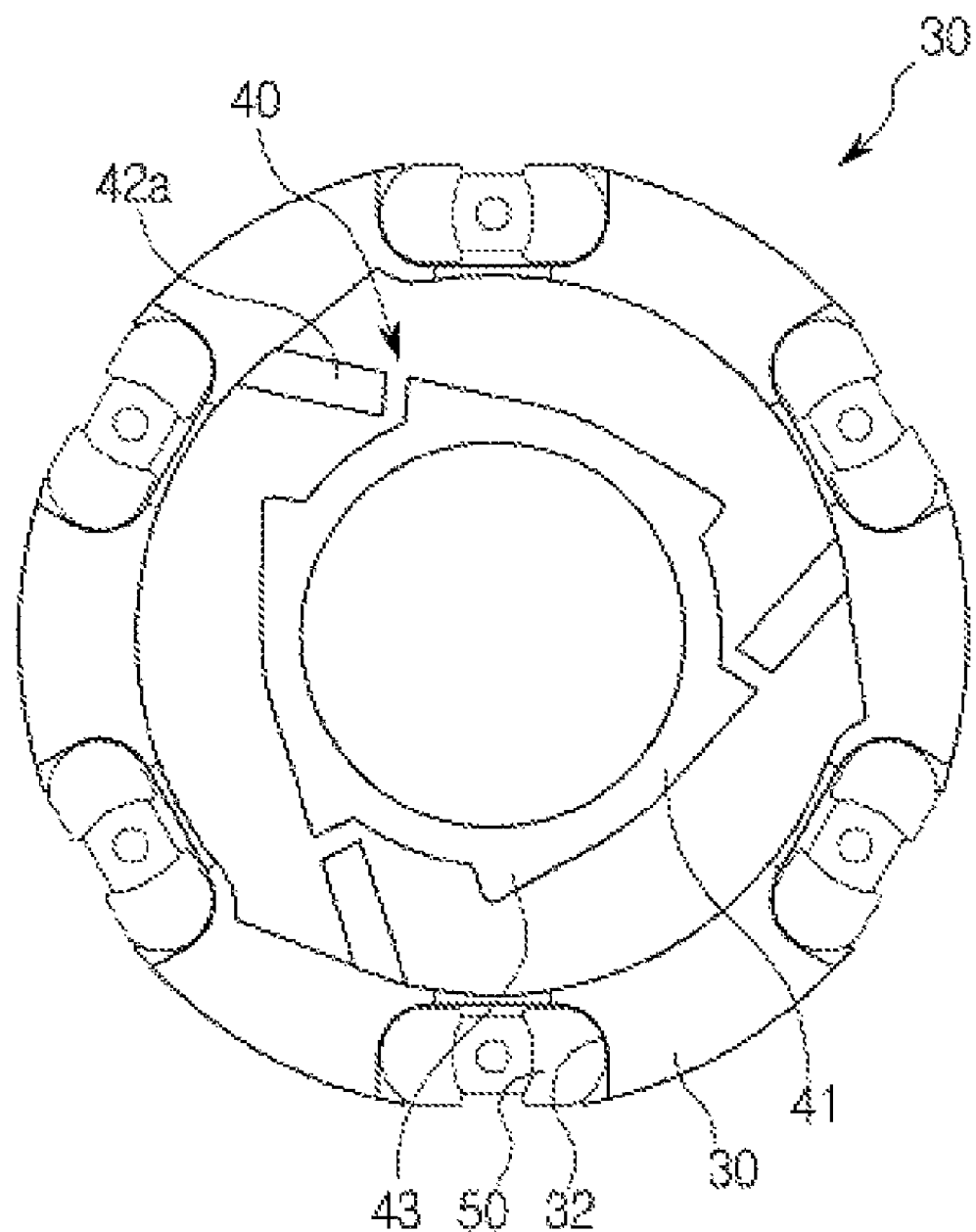
FIG. 2 is front view of a hub illustrated in FIG. 1.

The present invention will now be described more fully with reference to the accompanying drawings, in which exemplary embodiments of the invention are shown. The following embodiments just illustrate the present invention, and the scope of the present invention is not limited to the following embodiments.

Accordingly, the embodiments described in the present specification and the configuration shown in the drawings are just exemplary embodiments of the present invention and do not represent all of the technical spirit of the present invention. Thus, it should be understood that there may be various equivalents and modified examples that can replace the embodiments described in the present specification and the configuration shown in the drawings at the time of filling the present application.

A pulley, a hub, and a damper of a power transmission device of a clutchless compressor according to an embodiment of the present invention are the same as the pulley 10, the hub 20, and the damper 50 which are described previously, and thus, a detailed description thereof will be omitted.

Figure 3:
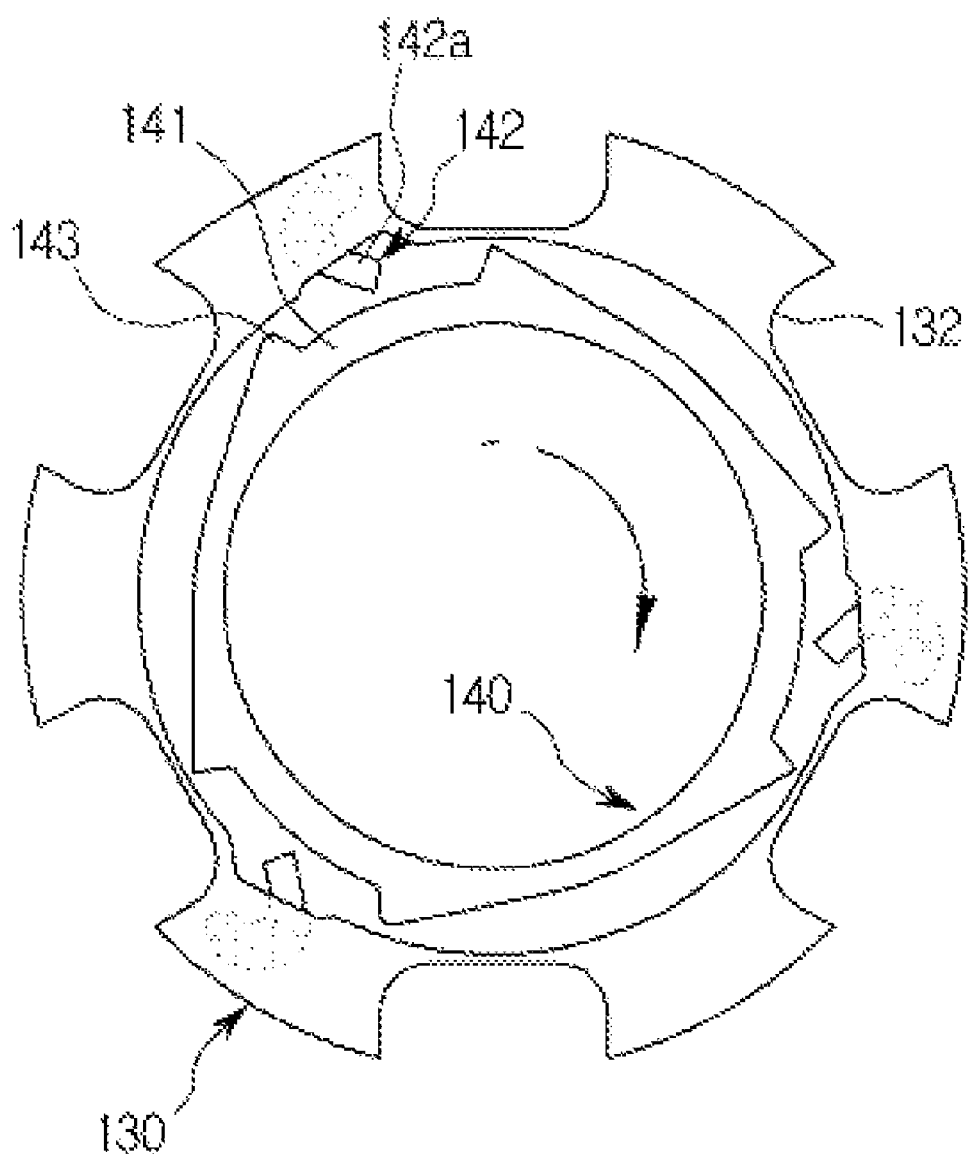
FIGS. 3 and 4 illustrate an operation in which a breaking portion of a drive-side connection member is broken, according to an embodiment of the present invention.
Figure 4:
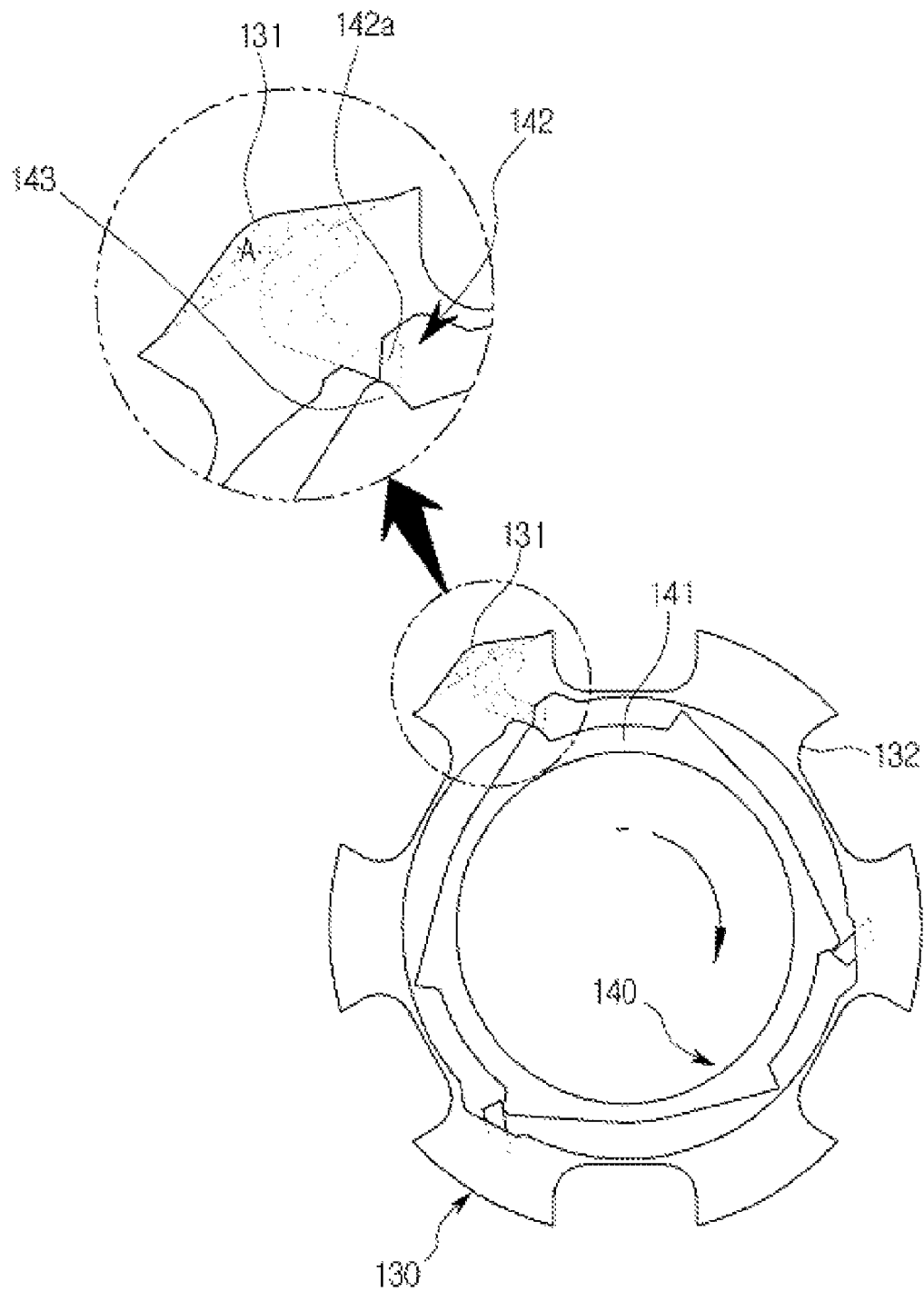

FIGS. 3 and 4 illustrate an operation in which a breaking portion of a drive-side connection member is broken, according to an embodiment of the present invention.

A breaking portion 142 of a drive-side connection member 140 connects a connection portion 141 with a driven-side connection member 130. When a torque above a preset value is generated in a compressor, the breaking portion 142 is broken and intercepts a power transmission path connected to the driven-side connection member 130 from the drive-side connection member 140.

After the breaking portion 142 is broken, a shock providing portion 143 is formed in the connection portion 141 of the drive-side connection member 140 and transmits a rotational shock to a remaining part 142a of the breaking portion 142 remaining in the driven-side connection member 130 and causing interference.

Here, if a rotational shock is applied to the remaining part 142a of the breaking portion 142 from the connection portion 141, i.e., the shock providing portion 143 even after the breaking portion 142 of the drive-side connection member 140 is broken, an outside of the driven-side connection member 130 should be plastic deformed or broken due to plastic deformation. To this end, the outside of the driven-side connection member 130 comprises a plastic deformation portion 131.

The operation of the power transmission device of the clutchless compressor having the above structure according to the present invention will now be described with reference to the accompanying drawings.

First, if a pulley is rotated by a rotational force transmitted from an engine belt connected to an engine as a driving power source, a rotational torque is transmitted to a hub via the drive-side connection member 140 and the driven-side connection member 130, and the driving shaft of the compressor connected to the hub is rotated.

In this case, if a failure such as seizing etc. occurs in the compressor and rotation of the drive shaft is stopped, a larger torque than a torque when rotating is applied to the hub, and if the torque exceeds a predetermined value, the breaking portion 142 of the drive-side connection member 140 is simultaneously broken, as illustrated in FIG. 4.

Next, as the pulley to which a rotational force is continuously supplied from the engine even after the breaking portion 142 of the drive-side connection member 140 is broken, rotates continuously, the connection portion 141 of the drive-side connection member 140 connected to the pulley rotates together.

Next, while the shock providing portion 143 formed in the connection portion 141 collides with the remaining part 142a of the breaking portion 142 remaining in the driven-side connection member 130, the remaining part 142a of the breaking portion 142 plastic deforms the driven-side connection member 130. An outer peripheral face of the plastic-deformed driven-side connection member 130 is expanded or broken (state A). Thus, the connection portion 141 of the drive-side connection member 140 prevents inference with the remaining part 142a of the breaking portion 142.

In other words, after the breaking portion 142 is broken, the remaining part 142a of the breaking portion 142 is slid in the driven-side connection member 130 simultaneously when the driven-side connection member 130 is plastic deformed and its outer peripheral face is expanded so that, even when the connection portion 141 of the drive-side connection member 140 rotates continuously due to the pulley, interference with the remaining part 142a of the breaking portion 142 does not occur, and noise does not occur, and damage of the engine belt is prevented.

Figure 5:
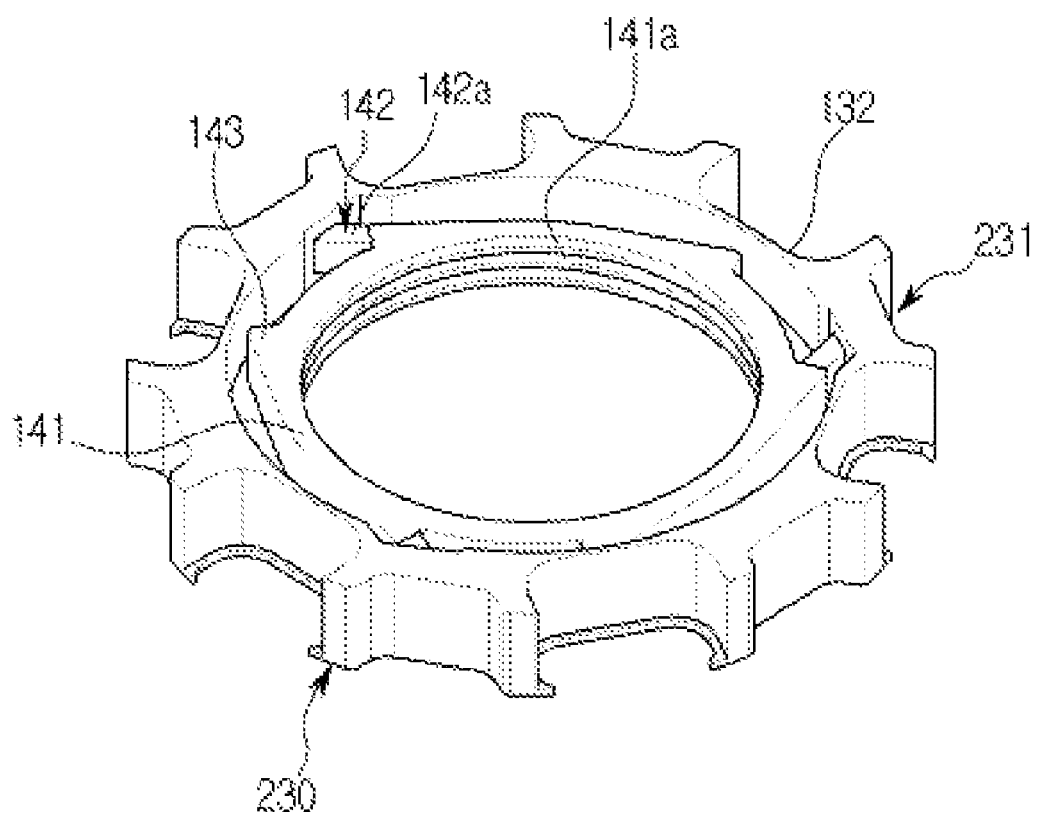
FIG. 5 is a perspective view of a driven-side connection member according to an embodiment of the present invention.
Figure 6:
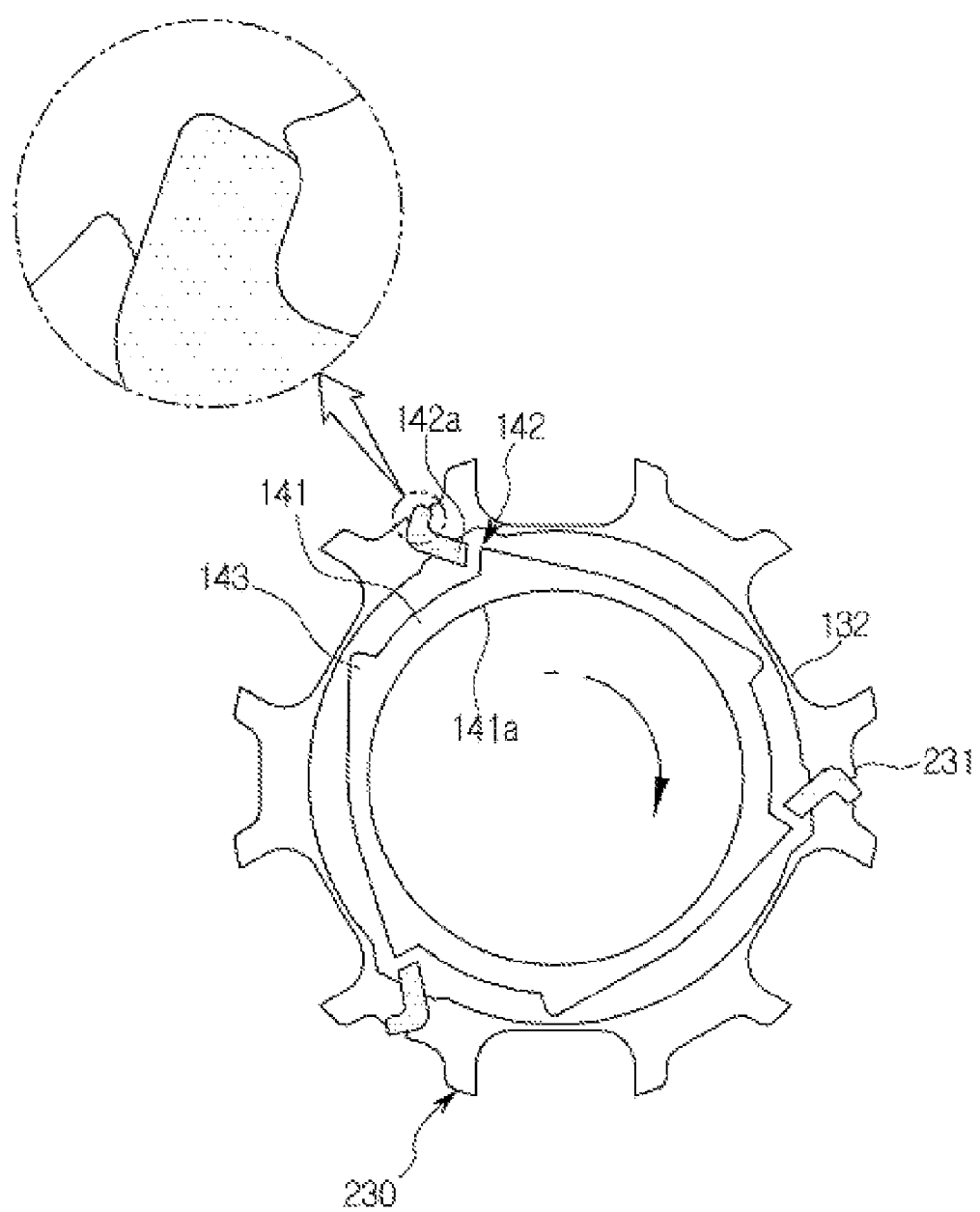
FIG. 6 is a front view of a driven-side connection member illustrated in FIG. 5.

FIG. 5 is a perspective view of a driven-side connection member according to an embodiment of the present invention, and FIG. 6 is a front view of a driven-side connection member illustrated in FIG. 5. Here, the same reference numerals as those described previously represent the same elements having the same configuration and function and thus, a repeated description thereof will be omitted.

Referring to FIGS. 5 and 6, a depression 231 is formed in a portion to which the breaking portion 142 of the drive-side connection member 140 is connected, of an outer peripheral portion of the driven-side connection member 230. In addition, the depression 231 is formed to have a small step difference toward the compressor and may prevent plastic deformation that may occur when the driven-side connection member 230 operates normally.

After the breaking portion 142 of the drive-side connection member 140 is broken, while the shock providing portion 143 formed in the connection portion 141 collides with the remaining part 142a of the breaking portion 142 remaining in the driven-side connection member 230 and when the remaining part 142a of the breaking portion 142 plastic deforms the driven-side connection member 230, the outer peripheral portion of the plastic-deformed driven-side connection member 230 may be expanded and may be interfered with a cover plate of the hub. However, the depression 231 is formed so that plastic deformation can be easily performed and the outer peripheral portion of the driven-side connection member 230 can be prevented from being interfered with the inside of the cover plate of the hub.

Figure 7:
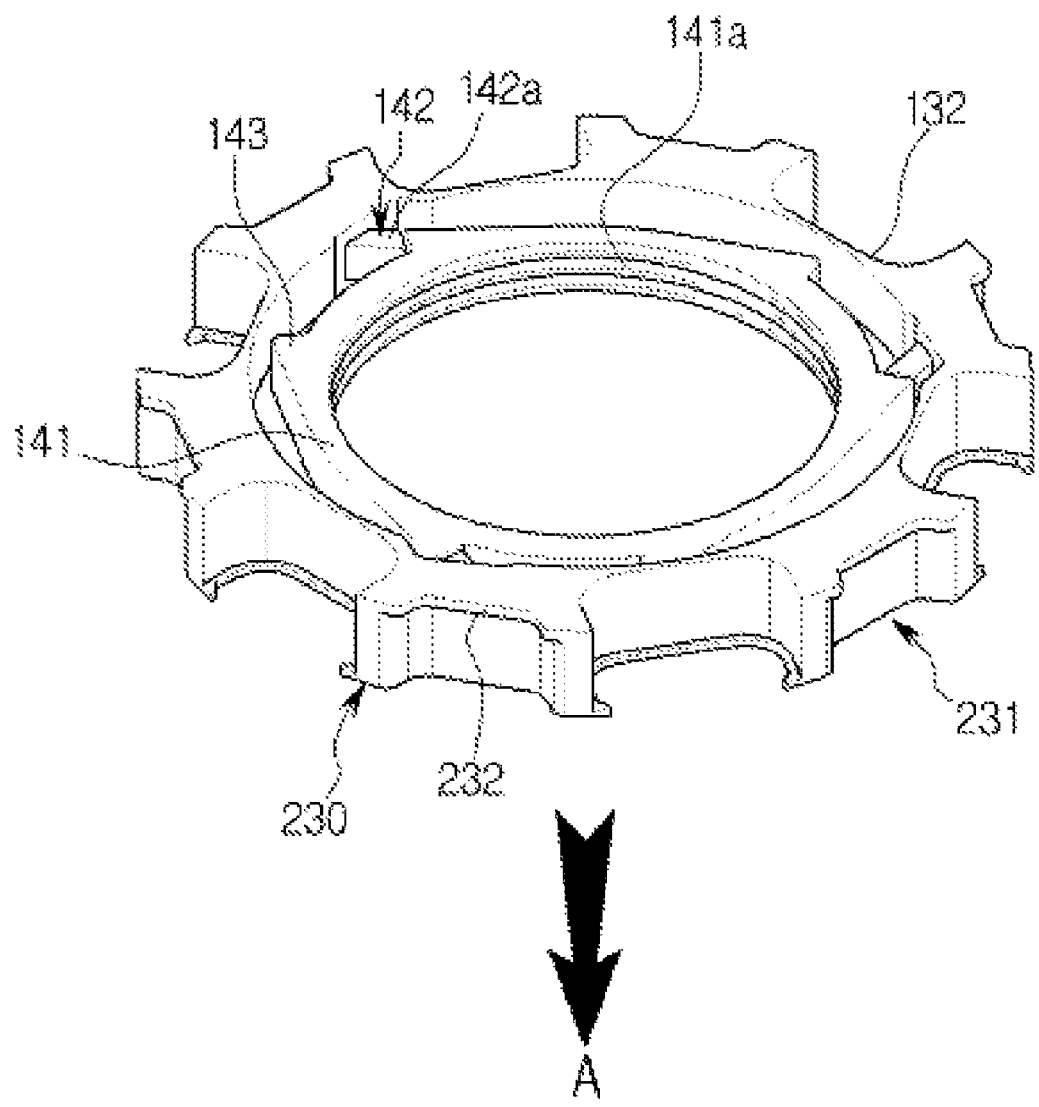
FIGS. 7 and 8 are perspective views of a driven-side connection member according to another embodiment of the present invention.
Figure 8:
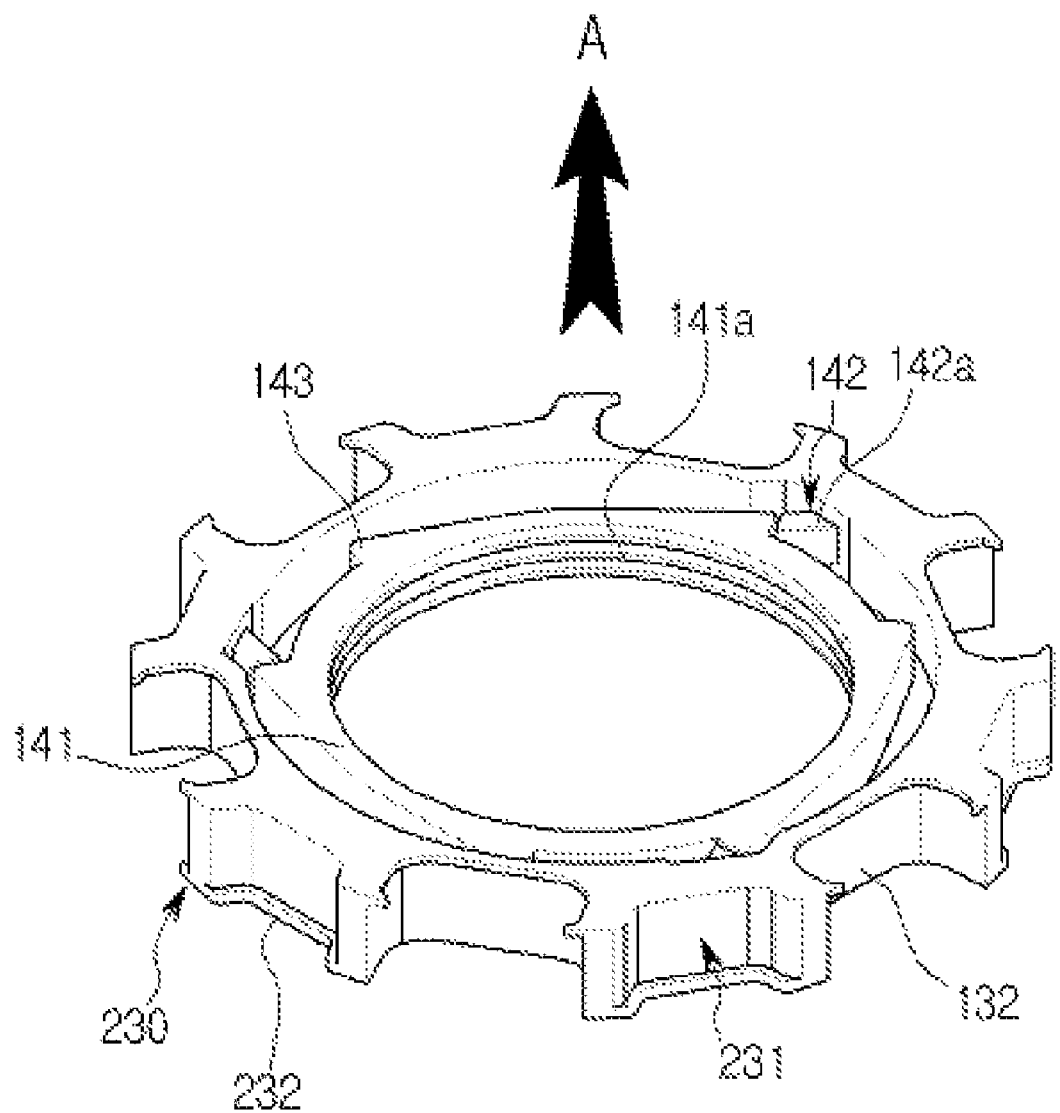

FIGS. 7 and 8 are perspective views of a driven-side connection member according to another embodiment of the present invention.

As illustrated in FIGS. 7 and 8, in a driven-side connection member 230 according to another embodiment of the present invention, a projection 232 may be formed in one side face of a depression 231 so that the depression 231 is stepped toward the compressor. Thick arrows illustrated in FIGS. 7 and 8 indicate a direction A toward the compressor. In this way, the projection 232 is formed in one side face of the depression 231 and the depression 231 is stepped toward the compressor so that plastic deformation that may occur when the driven-side connection member 230 operates normally.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A power transmission device of a clutchless compressor, the device comprising:
   a pulley rotated by a rotational force transmitted from a driving power source;
   a hub disposed in one side face of the pulley and connected to a driving shaft of a compressor;
   a drive-side connection member including a connection portion detachably connected to one side face of the pulley and a breaking portion connected to the connection portion and broken when a torque above a preset value is generated in the compressor; and
   a driven-side connection member including a plastic deformation portion formed on an outer peripheral face of the driven-side connection member, the driven-side connection member being connected to one side face of the hub and connected to the breaking portion,
   wherein after the breaking portion is broken into a driven-side remaining part connected on the driven-side connection member and a drive-side remaining part connected on the drive-side connection member, the plastic deformation portion is plastic deformed or is broken due to plastic deformation when a rotational shock is applied from the connection portion to the driven-side remaining part of the breaking portion.

2. The device of claim 1, wherein the driven-side connection member is formed of plastics.

3. The device of claim 1, wherein the plastic deformation portion is a depression formed in a portion to which the breaking portion of the drive-side connection member is connected, of an outer peripheral portion of the driven-side connection member.

4. The device of claim 3, wherein the driven-side connection member is formed of plastics.

5. The device of claim 3, wherein a projection is formed in one side face of the depression so that the depression is stepped toward the compressor.

6. The device of claim 1, wherein the plastic deformation portion is formed of a plastic material.

7. The device of claim 1, wherein, before the breaking portion is broken, the driven-side connection member is connected to the breaking portion through an inner peripheral face of the driven-side connection member.

8. A power transmission device of a clutchless compressor, the device comprising:
   a pulley rotated by a rotational force transmitted from a driving power source;
   a hub disposed in one side face of the pulley and connected to a driving shaft of a compressor;
   a drive-side connection member including a connection portion detachably connected to one side face of the pulley and a breaking portion connected to the connection portion, the breaking portion being broken when a torque above a preset value is generated in the compressor; and
   a driven-side connection member connected to one side face of the hub and connected to the breaking portion, the driven-side connection member including a plastic deformation portion formed on an outer peripheral surface of the driven-side connection member, wherein
   when the breaking member is broken, a remaining part of the breaking portion is connected to the driven-side connection member and disconnected from the drive-side connection member, and
   after the breaking member is broken, the driven side connection member plastic deformation portion is plastic deformed to prevent interference between the remaining part of the breaking portion on the driven side connection member and the connection portion when a rotational shock is applied from the connection portion to the remaining part.

9. The device of claim 8, wherein after the breaking member is broken, the plastic deformation portion is broken due to a plastic deformation to prevent interference between the remaining part and the connection portion when a rotational shock is applied from the connection portion to the remaining part.

10. The device of claim 8, wherein after the breaking member is broken, the remaining part is slid in the plastic deformation portion due to the plastic deformation to prevent interference between the remaining part and the connection portion when a rotational shock is applied from the connection portion to the remaining part.

11. The device of claim 8, wherein after the breaking member is broken, an outer peripheral face of the plastic deformation portion is expanded due to the plastic deformation to prevent interference between the remaining part and the connection portion when a rotational shock is applied from the connection portion to the remaining part.

12. The device of claim 8, wherein the plastic deformation portion is formed of a plastic material.

13. The device of claim 8, wherein, before the breaking portion is broken, the driven-side connection member is connected to the breaking portion through an inner peripheral face of the driven-side connection member.

* * * * *